United States Patent [19]
Schneuing

[11] Patent Number: 5,878,867
[45] Date of Patent: Mar. 9, 1999

[54] CARRIER DEVICE FOR A HANGING CONVEYOR

[75] Inventor: Ralf Schneuing, Bielefeld, Germany

[73] Assignee: Dürkopp Adler AG, Germany

[21] Appl. No.: 834,313

[22] Filed: Apr. 15, 1997

[30] Foreign Application Priority Data

Apr. 16, 1996 [DE] Germany .................. 196 14 905.3

[51] Int. Cl.[6] .................................................. B65G 17/32
[52] U.S. Cl. ................ 198/680; 198/486.1; 294/82.31
[58] Field of Search .............. 198/465.4, 485.1, 198/486.1, 680; 294/82.2, 82.31

[56] References Cited

U.S. PATENT DOCUMENTS

| | | | |
|---|---|---|---|
| 1,994,646 | 3/1935 | Heath | 198/177 |
| 4,239,435 | 12/1980 | Weiss et al. | 198/465.4 |
| 4,817,780 | 4/1989 | Davidsson | 198/680 |
| 5,143,201 | 9/1992 | Speckhart et al. | 198/465.4 |
| 5,404,989 | 4/1995 | Veen et al. | 198/365 |
| 5,480,020 | 1/1996 | Schneuing et al. | 198/465.4 |

FOREIGN PATENT DOCUMENTS

| | | |
|---|---|---|
| 0307045 | 3/1989 | European Pat. Off. . |
| 876075 | 5/1953 | Germany . |
| 3909002 | 7/1990 | Germany . |
| 9314051 | 3/1994 | Germany . |
| 4324426 | 7/1994 | Germany . |
| 4411877 | 10/1994 | Germany . |
| 29516745 | 2/1996 | Germany . |
| 2164909 | 4/1986 | United Kingdom . |

Primary Examiner—Joseph E. Valenza

[57] ABSTRACT

A conveyor pocket for a hanging conveyor system, in particular for the transport of conveyor articles hanging on hangers, having a pawl (3) which is arranged swingably in a base body (2) and is provided for holding in each case only one carrier on its hook-shaped head region (hook 20), the pawl (3) having an extension (4) protruding from the base body (2) for the swinging of the pawl (3) and thus the opening of the conveyor pocket (1), is characterized by the fact that the pivot axis (7) of the pawl (3) is arranged behind the resting point (15) of the hook (20) on the pawl (3) as seen in direction of transport (T).

14 Claims, 4 Drawing Sheets

5,878,867

CARRIER DEVICE FOR A HANGING CONVEYOR

BACKGROUND OF THE INVENTION

The present invention relates to a carrier device such as a conveyor pocket for a hanging conveyor system, in particular for transporting conveyed articles hanging on hangers, having a pawl which is pivoted in a base body, each pawl being intended to support one hanger by its hook-shaped head region (hook), the pawl having an extension protruding from the base body in order to swing the pawl and thus open the conveyor pocket. The invention furthermore relates to a method of introducing a hanger having a hook-shaped head region, and particularly a clothes hanger, into a conveyor pocket within an endlessly rotating hanging conveyor.

A conveyor pocket of this type is disclosed in EP-A 0 307 045, incorporated by reference herein. That conveyor pocket is designed, in particular, for conveying articles of clothing hanging on clothes hangers. During transportation, the hanger hook rests on the pawl. In order to prevent the hook from falling out of the conveyor pocket, the pocket can be closed by a tongue. This tongue is swingable in the direction opposite the direction of transport, so that the hanger hook can be introduced from the front into the receiving region of the conveyor pocket by swinging the closure pawl out of the way. The pawl is blocked in the direction of transport so that the hanger or hanger hook cannot fall out of the conveyor pocket during transport. In removing the hanger from the conveyor pocket, the pawl on which the hanger hook rests during transport is swung away in the direction opposite to the direction of transport, the hanger hook being gripped by the arm of the base body of the conveyor pocket and then sliding out of the conveyor pocket onto a removal bar which is arranged laterally alongside the conveyor line. In order to prevent the pawl from opening during transport by the weight of the hook resting on it, a closure spring is provided in the base body, the spring holding the pawl in its closed position.

There is the problem here that the hanger is imparted a negative acceleration upon the stripping off in the conveyor pocket. In order for it to reliably emerge from the delivery region, the slide bar must accordingly have a correspondingly large slope, which cannot always be easily realized due to considerations of space. Furthermore, the closure spring must be designed for the maximum load to be transported. Correspondingly high opening forces are necessary. If the force of the spring decreases during the course of operation, then, in particular, heavy articles of clothing can no longer be reliably conveyed. Due to the large number of structural parts, the known conveyor pocket is rather complicated in construction. Automatic loading of the conveyor pocket is not possible or is possible only with extremely complicated runs.

SUMMARY OF THE INVENTION

In accordance with an advantageous feature of the invention, a conveyor pocket of this type is improved so as to solve these problems. In particular, automatic loading is made as simple as possible by this improvement.

To solve the foregoing problems, a conveyor pocket of this type may have a pivot axis of the pawl which lies, with respect to the direction of transport, behind the point where the hook rests on the pawl.

By this arrangement, the conveyor pocket opens in the direction of travel, i.e. the opening of the pawl faces rearward as seen in the direction of travel. In this way, upon the opening of the conveyor pocket, no negative acceleration occurs on the hanger hook which is being hung upon the opening of the conveyor pocket. Accordingly, it is also no longer necessary to restart the movement of the delivered part, thus the sliding slope of the removal bar can be made correspondingly small.

Furthermore, the closing force of the pawl is increased by the hanger hook resting on it, thus no additional spring forces are necessary in order to close the conveyor pocket.

Since no spring forces need be overcome for the opening of the conveyor pocket, the hanger hook can be simply introduced from below into the receiving region of the conveyor pocket. This requires only slight forces to act vertically from below on the pawl in order for it to be swung. For this purpose, the pivot axis of the pawl lies in the horizontal direction outside of the receiving region of the conveyor pocket. In this way, an opening moment is exerted from below on the pawl by the action of force.

The pivot axis preferably lies behind the pivot point of the pawl with respect to the direction of transport so that the pawl always drops back into the closed position by its own weight.

It is particularly advantageous if the base body is developed in a U-shape in the receiving region of the hook and its two arms extend vertically downward. If the rear arm, as seen in the direction of transport, is longer than the front arm, a push-out region can be provided on it and the hanger hook can be pushed by it for the reception and delivery, whereby the corresponding acceleration is imparted to it from the conveyor system itself.

It is particularly advantageous for the pawl to engage, in its closed position, into a recess provided on the rear arm, with respect to the direction of transport, of the base body. In this way, a dependable closing of the conveyor pocket is assured, the receiving region then being closed all around. It is furthermore advantageous for the arms of the base body to be slit so that the pawl can be received in them.

The extension for the starting of the opening movement of the conveyor pocket preferably extends upward out of the base body In this way, it is possible to provide for opening the conveyor pocket in the delivery region, a magnetically or pneumatically controlled bolt which, in case of need, enters into the transport path and then comes against the extension of the pawl so that the pawl is pulled up upon the further transport of the conveyor pocket.

In order to assure a well-defined closed position of the pawl, in one advantageous embodiment of the conveyor pocket the pawl lies, in its closed position, against a stop which closes the slit provided in the front arm with respect to direction of transport.

Particularly simple manufacture is possible if the base body is formed of plastic and the pawl of metal. By the use of plastic, the conveyor pocket is correspondingly light so that the driving forces necessary for the conveyor system can be reduced, while the metallic pawl, as the part which is subject to wear, is made correspondingly resistant.

Above the base body in the hanging region for the hanging conveyor system, the conveyor pocket is so developed that it can be integrated into existing systems and in this way, for instance, be substituted for the conveyor pocket described in Federal Republic of Germany C1-39 09 002 incorporated by reference herein.

In view of the foregoing, for the automatic loading of the conveyor pocket, a method for introducing a hanger provided with a hook-shaped head region, particularly a clothes hanger, into the conveyor pocket within the endlessly rotating hanging conveyor, may comprise the following steps:

a transfer rail extends so close below the conveyor pocket that a hanger resting on the transfer rail is gripped by the conveyor pocket in the region of its head and is pushed in the transport direction;

the conveyor pocket pushes the hanger up into a region of the transfer rail which ascends in the direction of transport; in that connection:

during the course of the ascent, the hook of the hanger passes perpendicularly from below into the receiving region of the conveyor pocket, the receiving region being opened by the hook of the hanger, when the hook is completely in the receiving region, it is closed again by the action of gravity, after the transfer rail passes into a region descending in the transport direction, the hanger falls into the conveyor pocket and is then transported further, hanging in it.

Other features and advantages of an embodiment of the present invention will become apparent from the following description of the invention which refers to the accompanying drawings.

BRIEF DESCRIPTION OF THE DRAWINGS

The invention will be described in further detail below on basis of an embodiment. In the drawing.

DETAILED DESCRIPTION OF AN EMBODIMENT OF THE INVENTION

Figure 1:
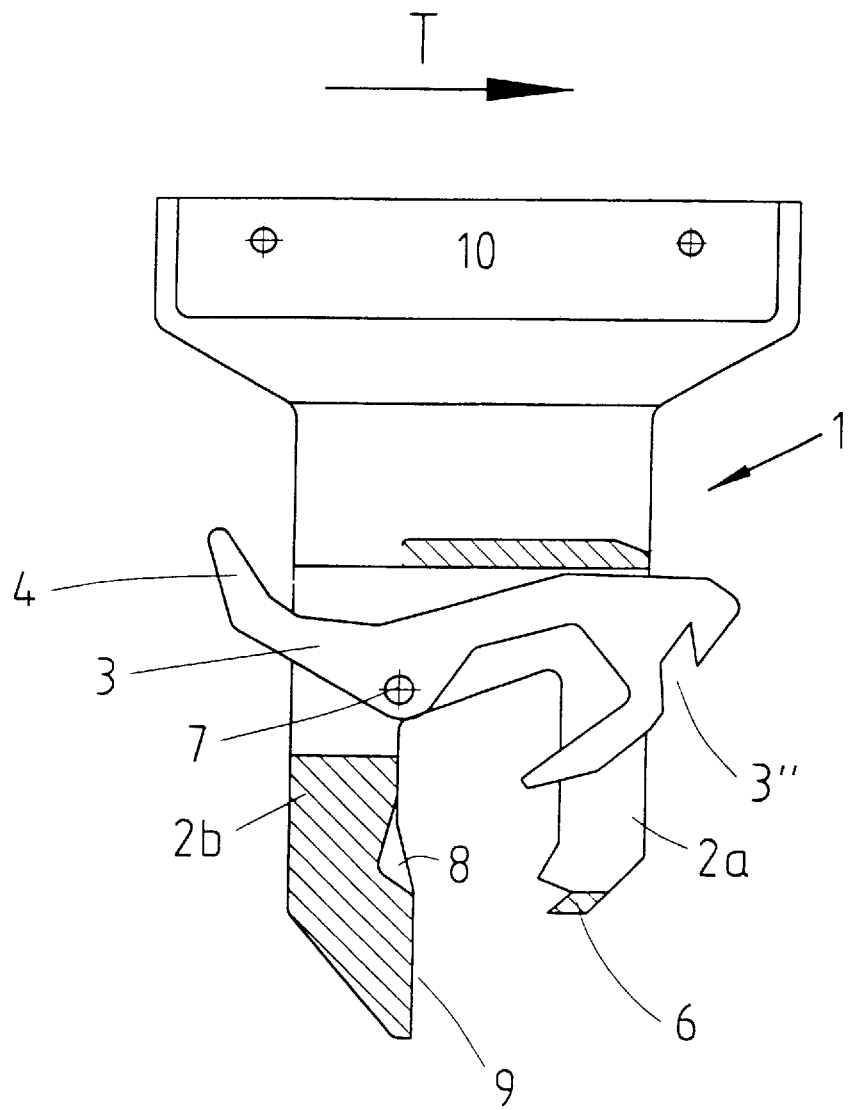
FIG. 1 is a partial cross-section taken through a conveyor pocket according to an embodiment of the invention with the pawl open.
Figure 2:
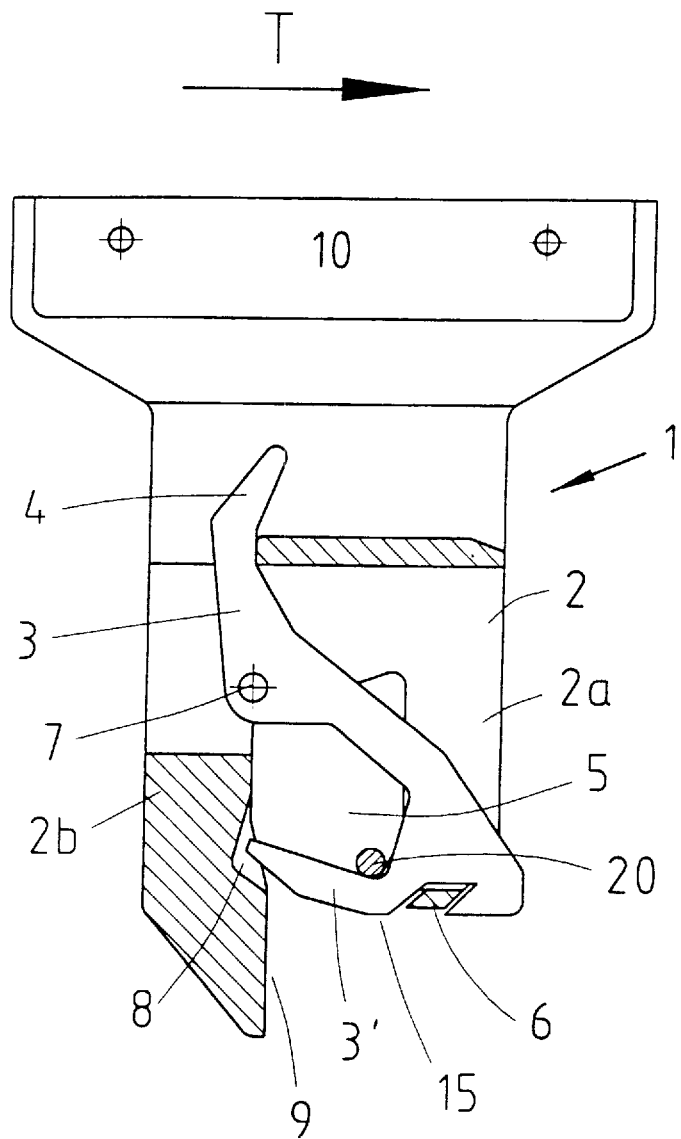
FIG. 2 shows the conveyor pocket of FIG. 1 with the pawl closed.

The conveyor pocket 1 has two parts, the base body 2 of plastic and the metal pawl 3. Above the base body 2 there is provided, integral with it, a feed structure 10 with which the individual conveyor pockets 1 can be connected in corresponding number with the conveyor chain of a hanging conveyor.

The base body 2 has a U-shape and its arms 2a, 2b point vertically downward so that a receiving region 5 is formed between them. The arm 2b of the base body 3 which is in the rear in the direction of transport T, is longer than the front arm 2a. The base body 2 is slit so that the pawl 3 can be arranged within it. The pawl 3 is substantially boot-shaped and has a foot 3', which serves to receive the hanger hook 20. In the closed position of the pawl 3, the side of the foot 3' which faces the receiving region 5 rises slightly in the direction opposite the direction of transport. By this structure, it is assured that the hanger hook 20 always slides into the front position. The pawl 3 is swingably connected to the base body by a bolt in a corresponding hole in the base body 2 so that the pivot axis 7 is formed in the center of the bolt. The pivot axis 7 lies outside the receiving region 5. In the embodiment shown, the pivot axis 7 is in the same vertical plane as the rear end of the receiving region 5 with respect to the direction of transport.

In the rear arm 2b of the base body 2 there is a recess 8 into which the foot 3' of the pawl 3 engages in the closed position of the conveyor pocket 1. A recess 3'' provided in the pawl 3 in front of the foot 3', with respect to the direction of transport, lies in the closed position against a stop 6 which closes the bottom of the slit 2a' in the arm 2a of the base body 2.

In its upper region, the pawl 3 is provided with an extension 4 which extends upward out of the base body 2. If a hanger hook 20 present in the conveyor pocket 1 is to be delivered, then in the delivery station 13, a release lever 12, which is just in front of the conveyor pocket 1 and is magnetically actuated swings into the region of the pocket. The pawl 3 then opens in the direction of transport T, i.e. the opening faces towards the rear and the hook 20 is deposited on an arm 17 arranged in the delivery station 13. The upper edge of the arm 11 is at the height of the highest point of the inner radius of the hook 20. In this way, a quiet depositing of even problematic parts is assured, for instance upon the transportation of bags where the center of gravity is at a very high level and angular movements result therefrom. The arm 2b is in this connection extended so far downward that a push-out region 9 is developed on it which conveys the hook 20, with the speed of conveyance of the conveyor, into the inclined arc of the delivery station 13. In this way an extremely slight slide slope in the further course can be realized, since renewed accelerating of the hook 20 is not necessary.

Figure 3A:
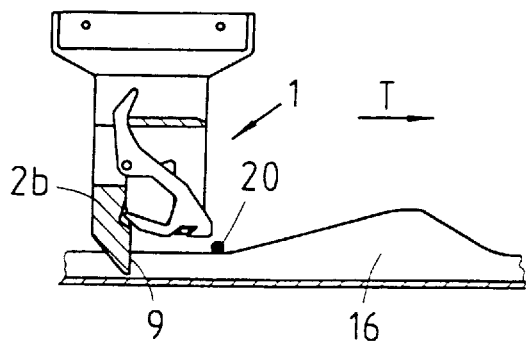
FIGS. 3a to 3f show the course of the automatic introduction of a hanger hook into the conveyor pocket.
Figure 3B:
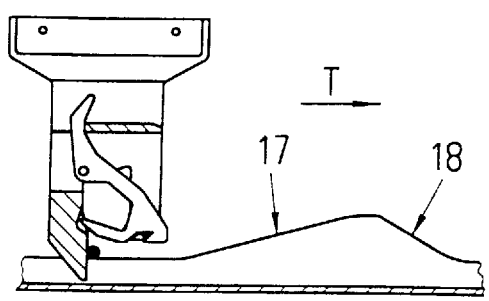
Figure 3C:
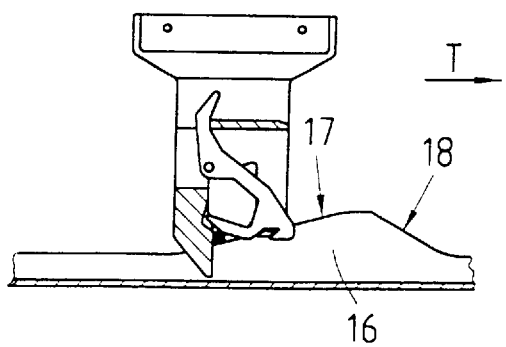
Figure 3D:
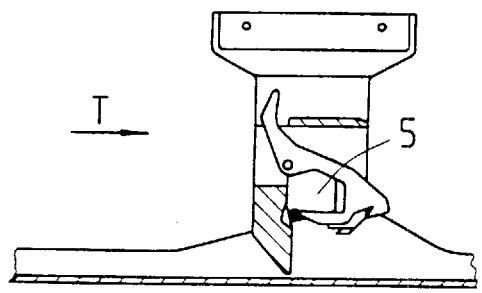
Figure 3E:
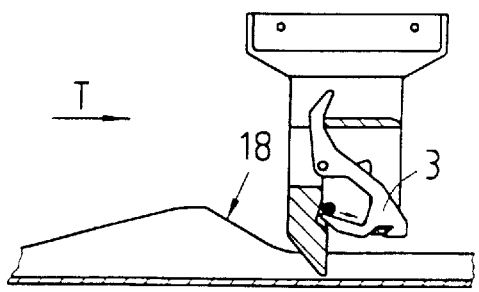
Figure 3F:
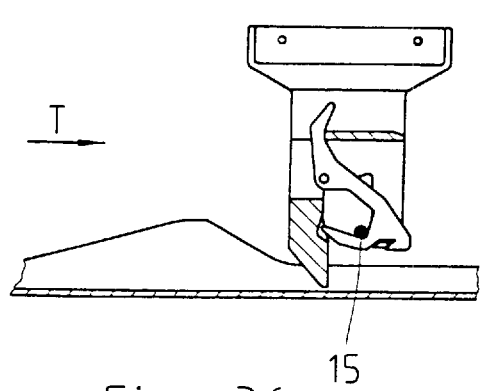
Figure 4:
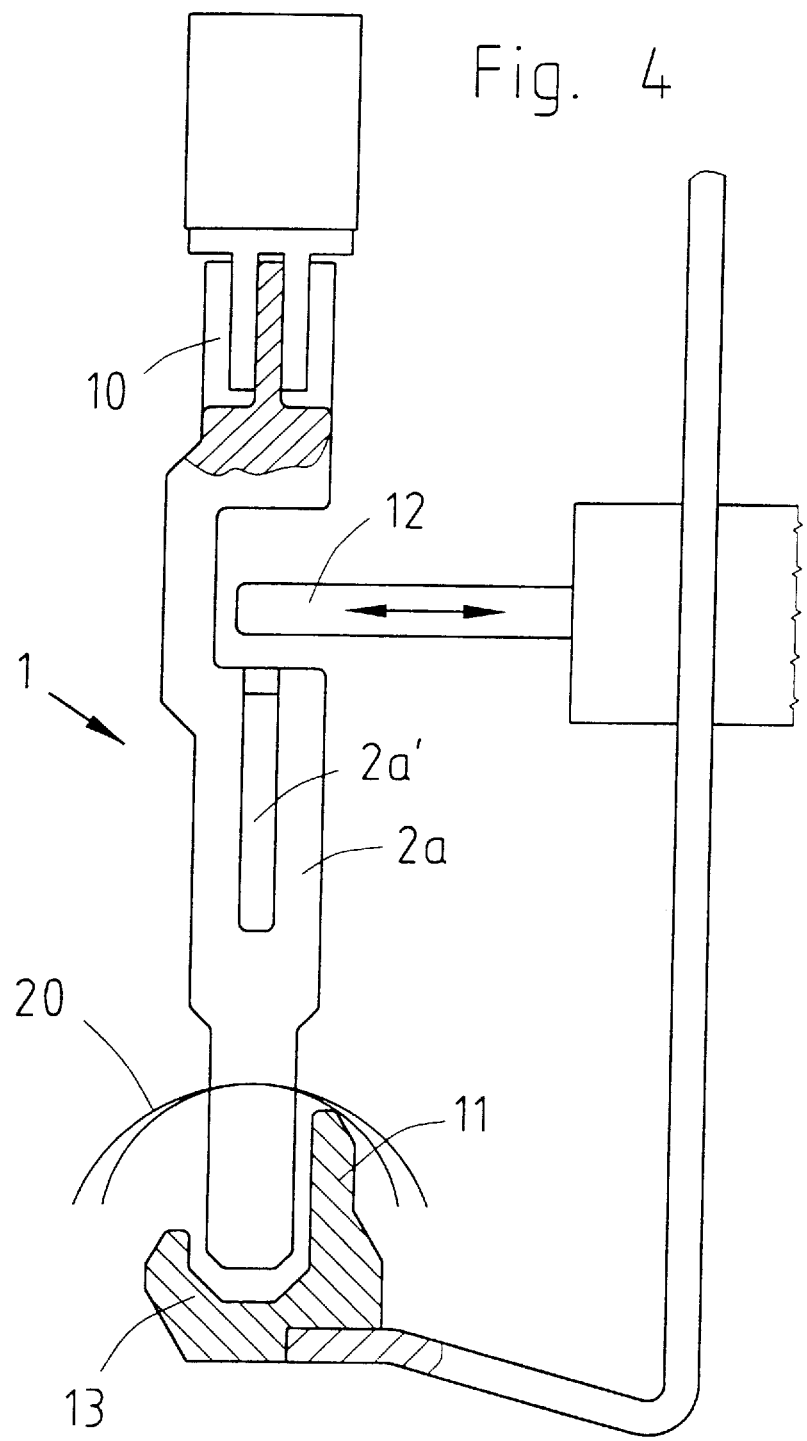
FIG. 4 is a diagrammatic view of a conveyor pocket which is present in the delivery station.

The automatic introduction of a hanger hook 20 into the conveyor pocket 1 will now be described below with reference to FIGS. 3a to 3f. Below the conveyor pocket 1 a transfer rail 16 having a region 17 which ascends in the direction of transport T and a descending region 18 following it is present in the delivery station 13. The hook 20 rests on the transfer rail 16. The arm 2b of the conveyor pocket 1 extends downward on the side of the transfer rail 16. The conveyor pocket 1 which is conveyed along the transfer rail 16, grips by the push-out region 9 of the arm 2b the hook 20 and pushes it forward in the transport direction T (FIG. 3b). Upon reaching the ascending region 17, the hook 20 is lifted and comes perpendicularly from below against the foot 3' of the pawl 3, which thereby opens in the direction of transport, as a result of which the hook 20 passes into the receiving region 5 of the conveyor pocket 1. During the further course of the ascending region 17, the hook 20 comes completely out of engagement with the foot 3' of the pawl 3, so that the latter drops back again into its closed position as a result of gravity. When the descending region 18 of the transfer rail 16 is reached, the hook 20 slides onto the foot 3' of the pawl 3, on which it again slides along the slope into the resting point 15, which is the front transport position (FIG. 3f).

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A carrier device for a hanging conveyor system in which the carrier device is moved in a predetermined direction of transport, the carrier device comprising:

(a) a base body which has front and rear ends opposite each other in said transport direction;

(b) a front arm connected to the front end of the base body, the front arm extending downward from the base body;

(c) a rear arm connected to the rear end of the base body, the rear arm extending downward from the base body; and (d) a pawl pivotally secured to the base body in a rear area of the base body through a pivot axis allowing the pawl to swing along a predetermined path from an open position in which a hook of a hanger may be placed on the pawl to a closed position in which the hook is secured by the pawl, the pivot axis being behind the hook with respect to the direction of transport when the hook is secured by the pawl.

2. A carrier device according to claim 1, wherein the pivot axis is located in the base body behind the center of gravity of the pawl with respect to the direction of the transport.

3. A carrier device according to claim 1, wherein the front arm and the rear arm define a U-shaped receiving region below the base body.

4. A carrier device according to claim 3, wherein the rear arm extends downward longer than the front arm.

5. A carrier device according to claim 3, wherein the bottom portion of the rear arm defines a push-out region, which pushes the hook into the receiving region.

6. A carrier device according to claim 5, wherein a recess is located in the front side of the push-out region with respect to the direction of transport, into which the pawl engages in the closed position, securing the hook within the carrier device.

7. A carrier device according to claim 6, wherein the front arm and the rear arm are aligned such that the pawl from the open position to the closed position along side the front arm and the pawl engages into the recess.

8. A carrier device according to claim 7, wherein the pawl is in the closed position when the pawl rests against a stop connected to the bottom of the front arm and a stopper located along the upper edge of the base body.

9. A carrier device according to claim 1, wherein the base body is formed of plastic.

10. A carrier device according to claim 1, wherein the pawl is formed of metal.

11. A method of introducing a hook of a hanger into a carrier device moving in a predetermined direction of transport within an endless rotating hanging conveyor system, the method comprising the steps of:

(a) resting the hanger on a transfer rail in which the transfer rail is located just below the carrier device;

(b) moving the carrier device toward the hanger on the transfer rail;

(c) pushing the hanger by the carrier device into an ascending region of the transfer rail;

(d) passing the hook of the hanger from the transfer rail along the bottom of a rear arm of a base body of a carrier device into a receiving region;

(e) closing the receiving region when the hook is completely within the receiving region, in which gravity permits the pawl to move into the closed position;

(f) securing the hanger in the carrier device after the carrier device passes over a descending region of the transfer rail; and (g) transporting the hanger in the carrier device.

12. A method according to claim 11, wherein the carrier device grips the hook of the hanger resting on the transfer rail and pushes the hook in the direction of transport.

13. A method according to claim 11, wherein the hook of the hanger passes perpendicularly from below the carrier device into the receiving region of the carrier device.

14. A method according to claim 11, wherein the receiving region is opened by the hook of the hanger.

* * * * *